(No Model.) 2 Sheets—Sheet 1.

J. W. OLIVER.
MITER CUTTING MACHINE.

No. 577,777. Patented Feb. 23, 1897.

WITNESSES:
Christopher Hondelink
Ambrose C. Hindman

INVENTOR
Joseph W. Oliver
BY Edward Taggart,
his ATTORNEY.

(No Model.) 2 Sheets—Sheet 2.

J. W. OLIVER.
MITER CUTTING MACHINE.

No. 577,777. Patented Feb. 23, 1897.

Witnesses
Christopher Hondelink
Ambrose E. Hindman.

Joseph W. Oliver Inventor
By his Attorney
Edward Taggart.

UNITED STATES PATENT OFFICE.

JOSEPH W. OLIVER, OF GRAND RAPIDS, MICHIGAN.

MITER-CUTTING MACHINE.

SPECIFICATION forming part of Letters Patent No. 577,777, dated February 23, 1897.

Application filed January 11, 1896. Serial No. 575,171. (No model.)

*To all whom it may concern:*

Be it known that I, JOSEPH W. OLIVER, a citizen of the United States, residing at the city of Grand Rapids, in the county of Kent and State of Michigan, have invented certain new and useful Improvements in Miter-Cutting Machines, of which the following is a specification.

This invention relates to certain new and useful improvements in machines for cutting miters of various kinds, (machines commonly known as "trimmers" or "trimming-machines;") and the invention consists in the novel method of adjusting the principal gage or wing which indicates the miter to be cut by the knife, said knife moving in ways and forming a shear cut with one edge or corner of the adjustable gage.

It also consists in the use of one or more angle-gages adjustable longitudinally with reference to the machine; also in the novel means of securing the gage in any required position by means of a taper-bolt used in connection with an ordinary bolt and thumb-nut for securing the swinging gage securely in position with reference to the bed; and the objects of my invention are, first, to produce an efficient and accurate means of gaging the angle to be cut by means of an adjustable gage having two bearings with reference to the frame of the machine; second, in combining with a miter-cutter one or more angle-gages which may be adjusted longitudinally of the machine by means of a groove, bolt, or other suitable means, so as to securely hold the stock to be operated upon between the gage proper and the angle-gage; third, in combining with the principal gage a taper-bolt which will secure the principal gage and retain the same in the required position. These objects I accomplish by means of the mechanism illustrated in the accompanying drawings, in which—

Figure 1:
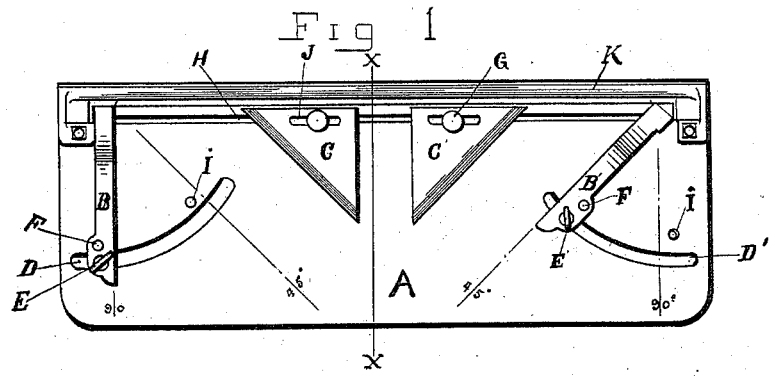
Figure 2:
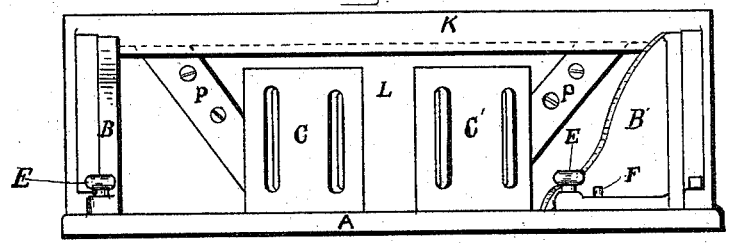
Figure 4:
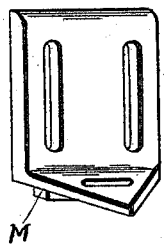
Figure 3:
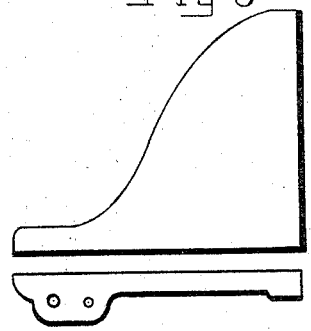
Figure 5:
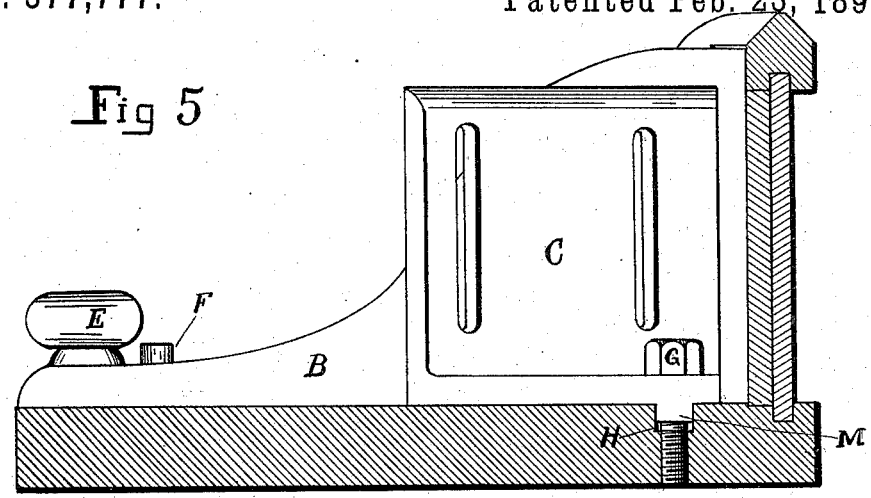
Figure 6:
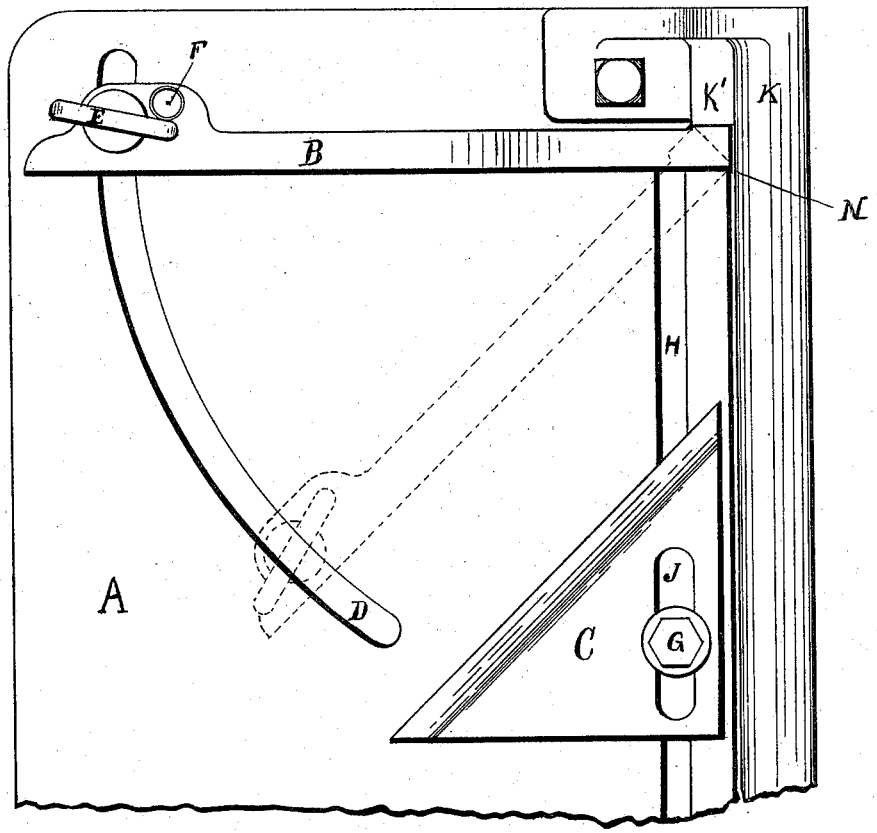

Figure 1 shows a plan view, which in the example of my invention shown in the drawings is provided with two principal gages and two angle-gages. Fig. 2 shows a rear elevation, or the side on which the gages are placed. Fig. 3 is a side elevation and a bottom plan view of one of the principal gages detached, the upper part of the figure showing the side elevation and the lower part showing an inverted plan. Fig. 4 is an elevation, partially in perspective, of one of the angle-gages, showing the groove for attaching the same to the bed and also the tongue which moves in the groove in the bed. Fig. 5 is a transverse vertical section on line X X of Fig. 1, showing one of the angle-gages in elevation, on an enlarged scale. Fig. 6 is a broken plan view of the machine, on an enlarged scale, showing the principal gage placed at right angles to the travel of the knife and also showing in dotted lines the position of the principal gage when moved so as to cut at an angle of forty-five degrees.

Similar letters refer to similar parts throughout the several views.

A represents the bed of the machine, constructed in the ordinary manner and provided with the grooves hereinafter described.

B represents what I call the "principal" gage. This gage when placed at right angles has a square bearing against the upright frame K; but whenever it is swung in from a right angle the corner of its inner edge N bears against the upright back frame of the machine, while the other corner bears against a post or a right-angle part of the frame of the machine—that is, as the gage B is turned toward the angle-gage C the wing or edge N bears against the back of the frame K, while its other front edge travels backward upon the post or angle part K'. By this means the edge N is always placed close to the travel of the knife and with the knife forms a shear cut upon the stock placed in position to be operated upon.

C represents the angle-gages, the same being placed between the principal gages and secured to the bed adjustably by means of the bolts G, the bolts G passing through grooves J in the angle-gages, and each angle-gage is provided, preferably, with a tongue M, which is adapted to travel longitudinally with reference to the groove H, the groove H extending substantially the length of the bed, so that each of the angle-gages C may be moved to any required position upon the bed of the machine and adjusted and held securely in position by means of the bolt G.

The reference-letters D and D' indicate curved slots cut through the bed A A, as shown, through each of which slots passes a bolt carried by the principal gages B and provided with a thumb-nut E, by means of which the gage is secured in any required position. Each slot is struck from the center of a circle and is a true arc of a circle, the center from which it is struck being approximately at the center of the end of the gage when the latter is set at an angle of forty-five degrees, or in the position shown in dotted lines in Fig. 6. In practice the slot is of sufficient width to allow the bolt to be readily moved without coming in contact with the sides of the slot, and when the bolt is tightened the outward end of the gage is set or fastened to cut the required angle. The function of the slot is merely to serve as a means for engaging the bolt with the nut in order to set the gage at the required angle.

F represents a taper-pin which is adapted to engage with the taper-openings $i$ in order to securely retain the gage in position when it is desired to cut a required angle. The most common form of angles used being either a right angle or an angle at forty-five degrees I have provided two of these taper-openings $i$ for each of the principal gages B, as shown in Fig. 1. If desired, more of these taper-openings may be used, so that the pin F may be readily engaged with any one of the openings in order to permanently retain the gage in position when it is desired to cut a large number of pieces at some specified angle.

L is a carriage adapted to move in grooves in the machine and has a reciprocal motion. The carriage L in the example of my invention shown in the drawings is provided with two knives P P, the machine being made double, so as to be operated from each end, as is ordinarily done in this class of machines.

By the construction above described the principal gage has no attachment to the machine at the end which forms the shear cut, and when the bolt is loosened by means of the thumb-nut E the same may be lifted free from the machine. Its bearings being rightangular the shear edge is always held in proper position to form a shear cut with the knife, and this end of the gage is always held firmly and securely in position by means of its two bearings, which bearings are placed at right angles to each other.

The principal use of the angle-gages is to hold irregular pieces of stock, such as moldings, securely in position when it is desirable to cut what is called a "miter," or to cut a piece of stock so as to form an angle of forty-five degrees, and in the drawings I have shown each of these angle-gages constructed so as to hold a piece of stock in position and firmly against the principal gage when the machine is used in cutting such angles. It will be readily understood, however, that the angle of the angle-gage may be made of any required size—that is, if it is desirable to cut a large number of pieces of irregular stock at right angles, differing from an angle of forty-five degrees, then the angle of the gage C would be constructed so as to hold the stock at the required angle at which the same was to be cut by the knife.

The object of using the taper-pin F, adapted to fit into the taper-openings, is to hold the principal gage more securely in some required position. As above stated, nearly all gages cut with a miter-machine or trimming-machine are either right angles or an angle of forty-five degrees, and where a large number of angles are cut of the same size I have found it desirable to add to the principal gage extra means of securing the same firmly in position.

In the drawings I have shown the groove H extending from one of the principal gages to the other; but it will be understood that this may be varied, and, if desired, instead of having a single groove two or more grooves may be used, and these grooves may extend from side to side or partially from side to side, as found desirable.

Having thus described my invention, what I claim to have invented, and desire to secure by Letters Patent, is—

1. In a miter-cutting machine, the combination with the bed and frame, of a gage having a face at right angles to its length and provided with two bearing-points consisting in the opposite edges or corners of said face, a post forming an abutment for one bearing-point, an upright frame K on the back of the frame of the machine having a flat surface arranged at right angles to the bearing-surface of the post and in line with the travel of the edge of the knife and forming a bearing-surface for the other bearing-point of the gage, and means for adjustably securing the opposite end of the gage, substantially as described.

2. In a miter-cutting machine, the combination with the bed and an upright frame, of a carriage bearing a knife and arranged to move in said upright frame and bed, an angle-gage, a groove in the bed extending parallel with the line of travel of the knife, a bolt passing through a portion of the angle-gage into said groove for longitudinally adjusting said angle-gage relative to said groove, and an adjustable swinging gage arranged adjacent to the inclined side of the angle-gage and adapted to be set at varying angles relative to the latter, substantially as described.

3. The combination with the bed, of a reciprocating carriage bearing two knives arranged at its opposite ends, two independent angle-gages each provided with a bolt engaging a groove in the bed extending parallel with the line of travel of the knives for adjusting the said angle-gages in said groove, and two adjustable swinging gages arranged on the opposite sides of the angle-gages and adapted to be set at varying angles relative to the latter, substantially as described.

In witness whereof I have hereunto set my hand and seal in the presence of two witnesses.

JOSEPH W. OLIVER. [L. S.]

Witnesses:
EDWARD TAGGART,
CHRISTOPHER HONDELINK.